Figure 1:
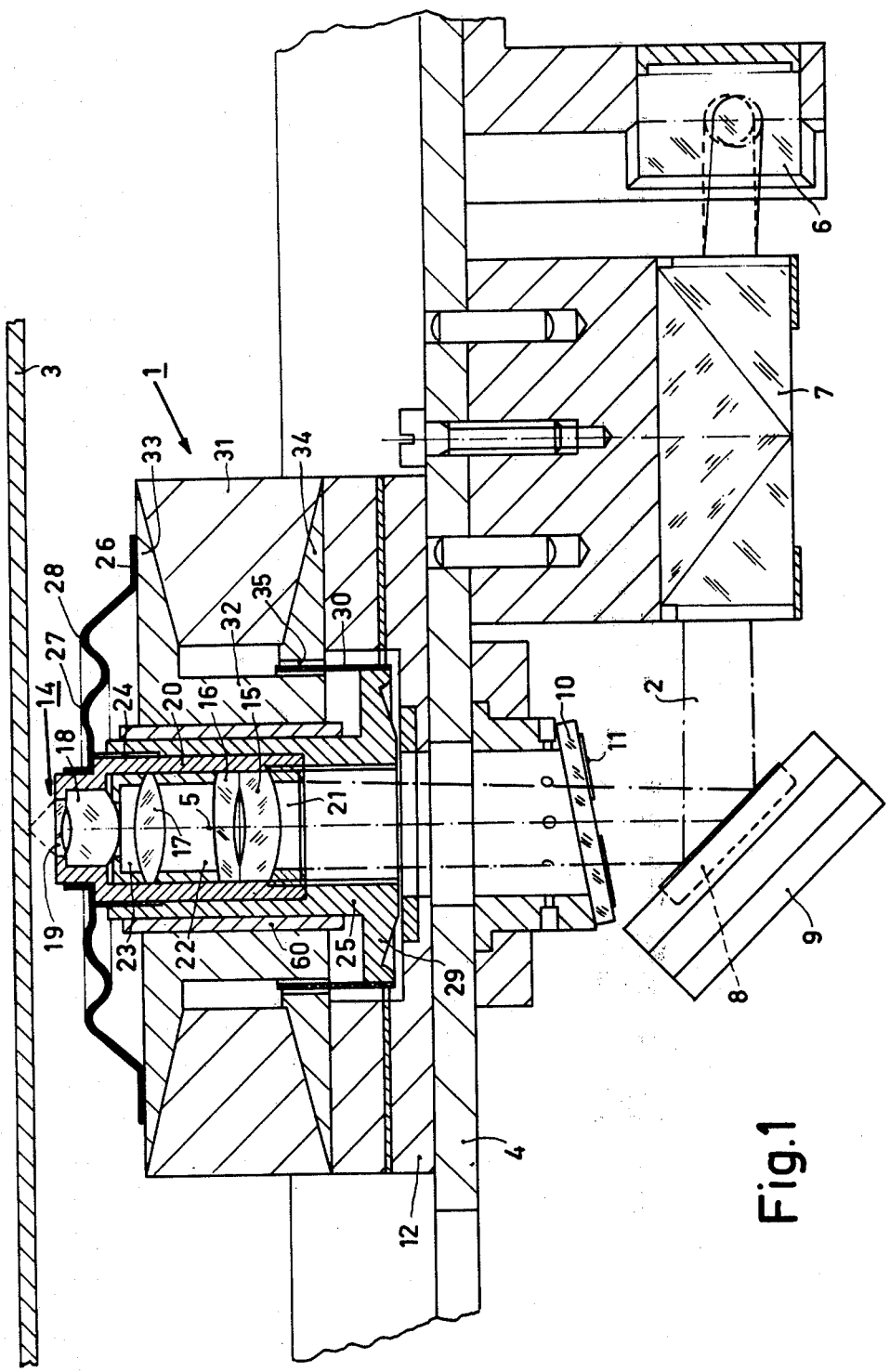

United States Patent

Camerik

[11] 4,021,101
[45] May 3, 1977

[54] OPTICAL FOCUSSING DEVICE FOR FOCUSSING A RADIATION BEAM

[75] Inventor: Eduard Camerik, Eindhoven, Netherlands

[73] Assignee: U.S. Philips Corporation, New York, N.Y.

[22] Filed: Apr. 16, 1975

[21] Appl. No.: 568,623

[30] Foreign Application Priority Data

Mar. 10, 1975 Netherlands .................... 7502803

[52] U.S. Cl. ........................ 350/255; 179/100.3 V
[51] Int. Cl.² ......................................... G02B 7/04
[58] Field of Search ....... 178/6.6 R, 6.6 DD, 6.7 R; 179/100.3 V, 100.4 R, 100.41 L; 350/78, 79, 81, 84, 186, 187, 255, 46

[56] References Cited

UNITED STATES PATENTS 3,861,786  1/1975  Badgett ............................ 350/255

FOREIGN PATENTS OR APPLICATIONS 979,727  1/1965  United Kingdom ................. 350/84

OTHER PUBLICATIONS

Janssen et al., Philips Technical Review, vol. 33, No. 7, 1973, pp. 190–193.

Primary Examiner—John K. Corbin
Assistant Examiner—F. L. Evans
Attorney, Agent, or Firm—Frank R. Trifari; Simon L. Cohen

[57] ABSTRACT

An optical focussing device for focussing a radiation beam on a record carrier, more particularly for focussing a light beam on a video record, the objective being included in an electronic position control system with the aid of an electromagnetic drive system by which it can be moved parallel to its optical axis. The parallel guide for the objective consists of a cylindrical bearing bush which is connected to the frame of the device, in which bush the lens mount of the objective is an accurate axially slidable fit. The lens mount preferably has an outer surface of opalized aluminium and the bearing bush an inner surface which contains PTFE.

7 Claims, 4 Drawing Figures

OPTICAL FOCUSSING DEVICE FOR FOCUSSING A RADIATION BEAM

The invention relates to an optical focussing device for focussing a beam, derived from a radiation source, on a record carrier, and more specifically for focussing a light beam from a light source on the reflecting surface of a video record, the device comprising a frame, an objective which comprises a number of optical lenses disposed in a lens mount, an electromagnetic drive system for axially moving the objective in the direction of its optical axis relative to the frame and consisting of movable as well as stationary electromagnetic means and at least comprising a magnet and a coil and a parallel guide for axially guiding the objective relative to the frame.

A device of this type is known for use in a video record player. In view of the selected playing time and the bandwidth of the recorded video signal, the device must be capable of observing minute details during playing of a record. This demands an optical system with a large aperture and thus a small depth of focus. Furthermore, a very accurate centering on the information track on the record is necessary of the light beam which is used for reading, which beam is obtained from a laser source. The record may exhibit deviations in planeness from 100 to 500 microns, while the depth of focus of the objective with which the read beam is focussed on the record is approximately 1 micron. Moreover, the eccentricity of the track may be 100 microns, while the light beam should be centered on the track with an accuracy of 0.2 micron so as to avoid crosstalk.

As was stated, a pressed record is never perfectly flat. It is true that during playing the record, which is always slightly deformable, is flattened owing to the centrifugal forces which occur at 25 to 30 revolutions per second, and moreover mechanical vibrations in the record are damped by the layer of air between the record and the top surface of the player, but yet allowance is to be made for movements of 500 microns in an axial direction. These 500 microns represent the amplitude of the 25 Hz component in the axial movement of the record surface. For components at higher frequencies the amplitude rapidly decreases as the frequency increases. A control loop with which the objective is kept in focus on the record with an accuracy of 1 micron, should therefore have a reduction of at least 500 times at 25 Hz. The mechanical parts of the focussing device should be as simple as possible so as to achieve a minimal cost price.

In the known focussing device the electromagnetic drive system consists of a cylindrical coil connected to the side of the objective which is remote from the record, and a permanent magnet circuit, the cylindrical coil being axially movable in an air gap in the permanent magnet circuit. The objective and the coil which is attached thereto can be moved relative to the permanent magnet circuit by applying a voltage to the coil in a similar way as the drive of a moving-coil loudspeaker. The objective is suspended in leaf springs which are comparatively slack so as to avoid great forces for moving the objective outside of the resonant range. The currents required for this through the cylindrical drive coil would cause a heating which is undesirable for the optical elements of the objective. On the other hand, the springs are sufficiently rigid in order to prevent lateral movements of the objective. ("Control Mechanisms in the Philips "VLP" record player," P. J. M. Janssen and P. E. Day, Philips Technical Review 33, page 190, 1973, no. 7).

Owing to the suspension method of the objective with the aid of leaf springs, the objective together with the masses and leaf springs attached thereto constitute a substantially undamped mass spring system. In view of the required stability of the control loop which includes the said mass spring system, this lack of damping may be regarded as a disadvantage of the known device, while moreover parasitic resonance of the springs may occur. Another drawback is the fairly intricate mounting of the objective, in view of the necessity of the mechanical connection of the leaf springs to both objective and the stationary parts of the focussing device.

It is an object of the invention to provide a focussing device of the type mentioned in the preamble which mitigates said drawbacks and the invention is characterized in that the parallel guide comprises a cylindrical bearing bush which is attached to the frame and that the lens mount of the objective is an accurate axially slidable fit in the bearing bush. Apart from providing excellent guidance of the objective, the focussing device according to the invention also allows the objective to be fitted very simply, namely by merely sliding it into the bearing bush. The damping is obtained as a result of friction between the outer surface of the lens mount and the inner surface of the bearing bush. It is of importance in this respect that such as combination of materials is selected that the occurrence of so-called "stick-slip" phenomena is minimized, which would impair the positional control of the objective and that furthermore the moving mass of the objective is minimal. It is therefore advantageous when in accordance with an embodiment of the invention the lens mount has an outer surface which consists of anodized aluminium and the bearing bush has an inner surface which contains PTFE (poly tetra fluor ethylene).

In order to prevent undesired dust particles from penetrating the focussing device and to prevent undesired transverse movements relative to rotational movements of the objective to the bearing bush an embodiment of the invention is of importance which is characterized in that at the side which should face the record carrier the objective is attached to the frame by means of a concentrically disposed flexible cuff provided with concentric folds.

An embodiment of the invention which has performed satisfactorily in practice and which like the known focussing device mentioned in the preamble was provided with electromagnetic means consisting of a cylindrical coil which was connected rigidly and in an axially related manner to an axial end of the lens mount and of a permanent-magnet circuit with a cylindrical air gap for the coil is characterized in that in the center of the cylindrical permanent magnet a cylindrical soft-iron magnet core is disposed, the cylindrical permanent magnet at one of its axial slides is covered with a soft-iron closing plate, and the cylindrical air gap is situated between the wall of a central opening in the closing plate and the magnet core.

It is obvious that the focussing device with its frame is connected to parts of the apparatus for playing the record carrier. It is advantageous when for removing the objective from the stationary parts of the focussing device the number of disassembly operations is minimal. In view of this a following embodiment of the invention is of importance, which is characterized in that the closing plate is disposed at the side of the objective which is to face the record carrier. When the focussing device, as in the previously described embodiment, is provided with a flexible cuff, it is advantageous if the flexible cuff is disposed on a detachable cover which surrounds the relevant end of the objective, the cover comprises a number of metal connection tags which extend through a wall of the cover at either side and a number of coil terminations of the coil which is attached to the objective are connected to the connection tags. The objective and the cover may then be provided with mutually cooperating stop means which limit the axial travel of the objective relative to the cover. Thus, the cover together with the flexible cuff may readily and bodily be removed from the other stationary parts of the focussing device unimpeded by the electrical connection wires from the coil.

Figure 2:
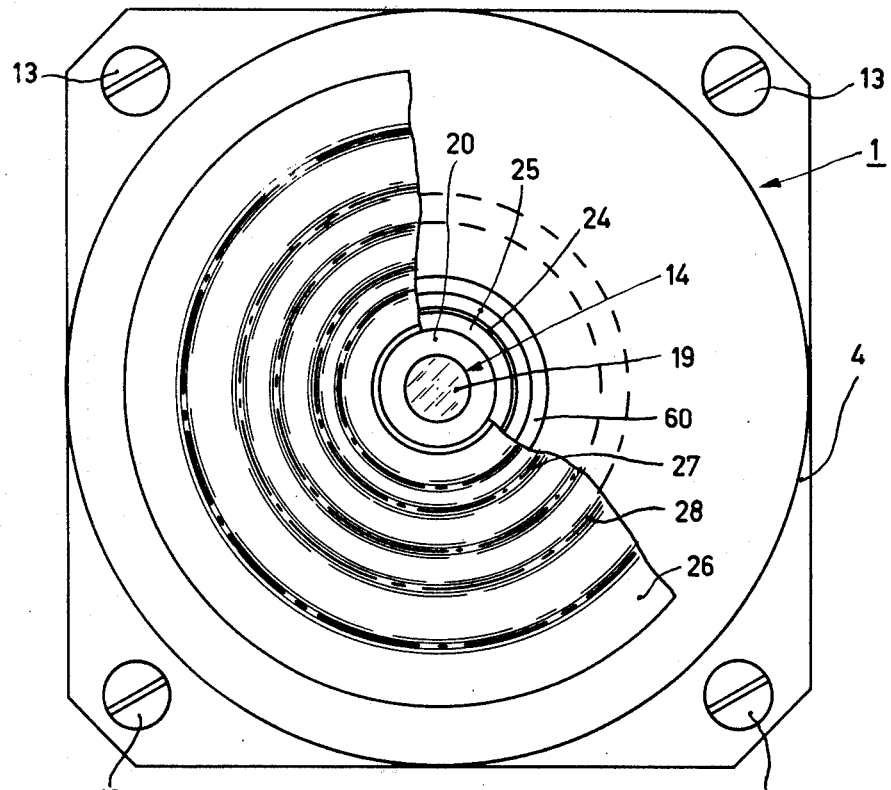
Figure 3:
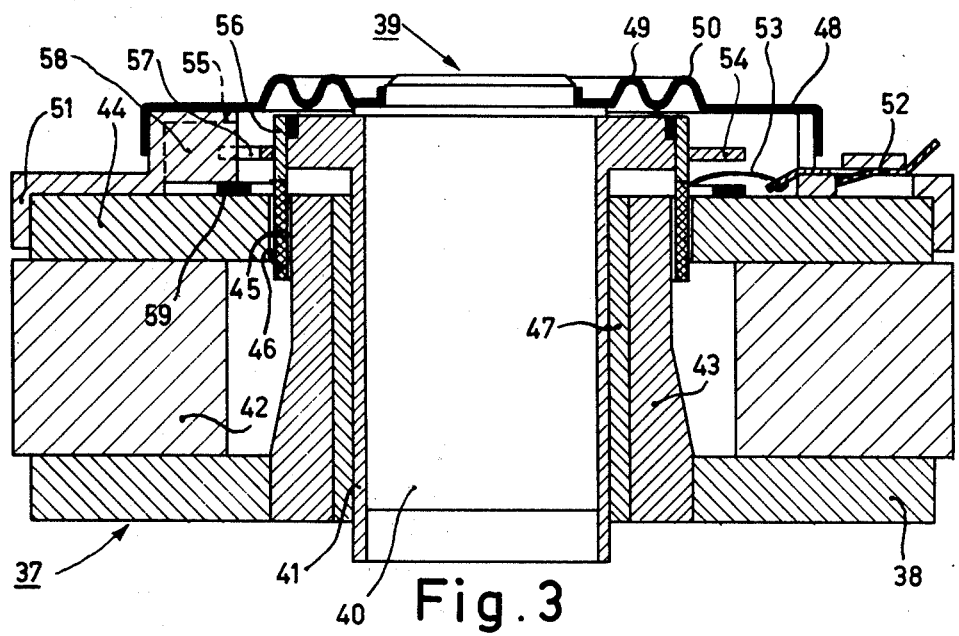
Figure 4:
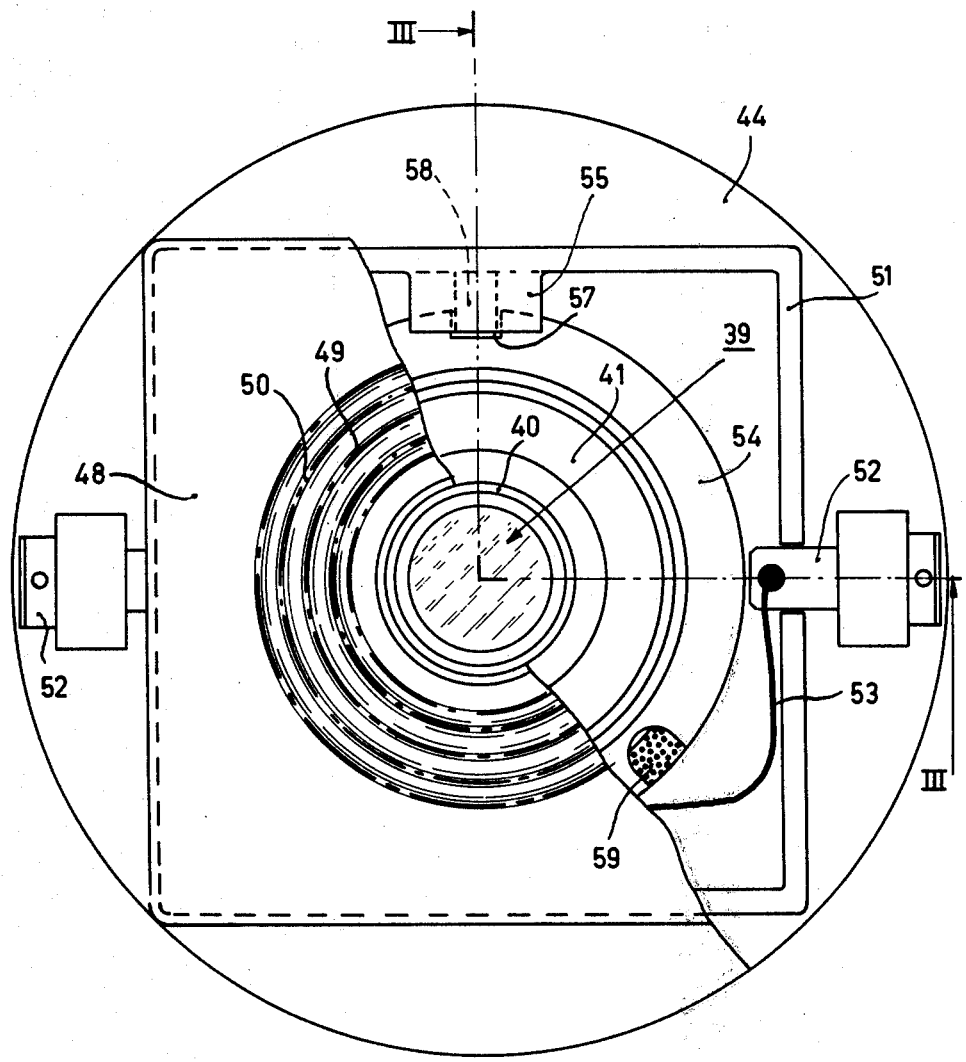

The invention will be described in more detail with reference of the drawing, in which FIG. 1 is a cross-section through the center of a focussing device which is disposed underneath a video record at a movable carriage on which, apart from the focussing device, also other optical components of the optical path are mounted, FIG. 2 is a top view of the focussing device of FIG. 1, a part of the flexible cuff being cut away, FIG. 3 shows a sectional view (taken on the line III—III, FIG. 4) of a modified embodiment of a focussing device, in which the flexible cuff is secured to a cover for the objective and the objective can be plugged into the remainder of the device from the top, and FIG. 4 shows a top view of the focussing device of FIG. 3, a part of the flexible cuff being cut away.

In FIG. 1 the focussing device is denoted by the reference numeral 1. The device serves for focussing a radiation beam 2 from a radiation source, not shown, onto the reflecting lower surface of a video record 3. FIG. 1 only shows parts of a video record player which are of significance for the description of the invention. For a more comprehensive description of the basic operation of a video record player, reference is made to the article "The Philips' VLP System", Philips Technical Review 33, 178–180, 1973, no. 7 which is hereby incorporated by reference. The focussing device 1 is secured to a carriage which is designated by the reference numeral 4. The video record 3 is rotated by appropriate means, not shown, about an axis parallel to the optical axis 5 of the focussing device. The carriage 4 is moved by means of an electric motor in a direction transverse to the axis of rotation of the video record, so that the light beam 2 from the laser source can read the spiral information track on the video record. Before the light beam 2 reaches the focussing device 1 the beam is reflected by a mirror 6 and is passed through a so-called Wollaston prism 7, then reflects at the reflecting surface of a mirror 8 which forms part of an electrically controllable tilting mirror 9, finally reaching the focussing device 1 via an optical element 10 which carries a number of quarter-wavelength plates 11.

The focussing device 1 comprises a frame 12 which by means of a number of bolts 13, see FIG. 2, is secured to the carriage 4. In this Application "frame" is to be understood to mean: the assembly of interconnected stationary parts which are associated with the focussing device. The objective 14 comprises a number of optical lenses 15 through 19, which are disposed in a mounting bush 20. The lenses are fixed in this bush by means of a nut 21 and two spacers 22 and 23. By means of thread 24 the mounting bush 20 in its turn is mounted in a sliding bush 25. The mounting bush 20 and the sliding bush 25 together form the lens mount of the objective.

The parallel guide for the objective comprises a cylindrical bearing bush 60 which co-operates with the sliding bush 25. Said last-mentioned bush is an accurate axially slidable fit in the bearing bush.

At the top the objective 14 is connected to the frame 12 by means of a flexible cuff 26, which has two concentric folds 27 and 28. The sliding bush 25 is made of aluminium and has a very hard and smooth outer surface which is obtained by opal anodization of the aluminium in accordance with a method known from the Applicant's British Pat. Specification No. 1,127,098 published September 11, 1968. According to this British patent, the opal anodization of the aluminium may be accomplished by the use of the following exemplary method utilizing the chemicals listed below:

Oxalic acid 115 gms/litre
chromic anhydride 25 gms/litre and
potassium hydroxide 20 gms/litre This solution was adjusted with oxalic acid to a pH value of approximately 1.5 and was used at a temperature of 50° to 55° C.

In this bath articles consisting of non-alloyed aluminium having a purity of 99.5% of Al, or consisting of an aluminium alloy, for example, with 1% Si, 0.6% Mg and 0.7% Mn as alloy components, were coated with an opaque oxide layer using a cathode of aluminium.

The bath voltage was kept between 70 and 90 volts for 30 minutes, in which the anode current density initially was approximately 2 amps/sq.dm and then is raised to 110–120 volts in 1 minute and kept at this value for 30 minutes. The anode current density is then about 1 amp/sq.dm. The resulting layer had a hardness of approximately 450 VPN. This outer surface co-operates with the inner surface of the bearing bush 60 which in view of its suitable lubricating properties and absence of "stick-slip" tendencies is provided with PTFE. Excellent practical performance has been obtained with a bearing bush which was made of material of the trade name Glacier with the designation DU supplied by The Glacier Metal Company Ltd., 368 Ealing Road, Alperton, Wembley, Middlesex, England. The material consists of a steel base on which a porous bronze layer is disposed having a surface layer of a PTFE-lead mixture which also fills the pores of the porous bronze layer.

For driving the objective in the direction of its optical axis a number of electromagnetic means are provided. The sliding bush 25 is provided with a flange 29 at its lower end, on which a cylindrical coil 30, similar to a loudspeaker coil, is disposed. Furthermore, a permanent-magnet circuit is provided with a cylindrical permanent magnet 31. In the center of this magnet a cylindrical soft-iron magnet core 32 is disposed, which at its upper axial end is widened to form a flange 33. At the other end of the magnet 31 a soft-iron closing plate 34 is disposed. Between the wall of the central opening of this closing plate and the cylindrical portion of the magnet core 32 a cylindrical air gap 35 for the coil 30 is formed. The permanent magnet 31 is axially polarized and is secured between the slightly tapered flange 33 and the closing plate 34 with the aid of a number of fixing bolts 36.

At its circumference the cuff 26 is attached to the flange 33 of the magnet core by cementing. At its inner circumference it is resiliently clamped around the end of the objective 14.

In the embodiment of FIG. 3 the focussing device is designated by the reference numeral 37. It comprises a frame 38, an objective 39 with a lens mount which includes a lens bush 40 and a sliding bush 41, a permanent magnet 42, a soft-iron magnet core 43, a soft-iron closing plate 44, a cylindrical coil 45, an air gap 46, bearing bush 47 and a flexible cuff 48 provided with two concentric folds 49 and 50. In this embodiment the closing plate 44 is disposed at the side of the objective which is to face the record carrier. This yields the great advantage that when the focussing device is mounted on a carriage the objective 39 together with the objective mount 40, 41 and the coil 45 can be removed and fitted from above.

In the embodiment of FIG. 3 and 4 the cuff 48 is secured to a detachable cover 51. This cover is made of a plastic and tightly pressed onto the closing plate 44. It is obvious that other appropriate fixing methods for securing the cover to the closing plate may be used. The cover comprises two metal connection tags 52. These serve for electrically connecting the coil terminations 53 of the coil 45 to the electronic control circuit which controls the position of the objective 39.

The assembly of cover 51, objective 39, cuff 48, objective mount 40, 41 and coil 45 can be removed from the remaining parts of the focussing device in an axial direction. This is greatly facilitated by the fact that the coil terminations of the coil are connected to the connection tags 52 which are provided on the cover, so that the coil terminations need not be disconnected. Furthermore, assembly of the said components to a single unit is facilitated in that the objective 39 and the cover 51 are provided with mutually co-operating stop means 54 and 55. The stop means 54 consists of a ring which is secured to a cylindrical coil base 56 and comprises two radial slots 57. Two ribs 58 engage these slots and serve to prevent excessive rotation of the objective relative to the frame during mounting or removal, which might lead to damaging of the coil terminations. The stop means 55 is located at the top of the rib 58.

Further, a rubber stop ring 59 is cemented onto the closing plate 44 to limit the downward travel of the objective.

What is claimed is:

1. An optical focussing device for focussing a radiation beam from a radiation source on a record carrier, in particular for focussing a light beam from a light source on the reflecting surface of a video record, which device comprises:
    a frame
    an objective comprising a number of optical lenses disposed in a lens mount,
    an electromagnetic drive system for axially moving the objective in the direction of its optical axis relative to the frame and comprising a toroidal permanent magnet mounted on said frame and providing a cylindrical air gap and a movably mounted coil in said air gap, and
    a parallel guide for the axial guidance of the objective relative to the frame, characterized in that
    the parallel guide comprises a cylindrical bearing bush which is connected to the frame, and
    the lens mount of the objective is an accurate axially slidable fit in the bearing bush and is connected to said coil, said lens mount and parallel guide being coaxial with said permanent magnet.

2. An optical focussing device as claimed in claim 1, characterized in that
    the lens mount has an outer surface of anodized aluminium, and
    the bearing bush has an inner surface which contains PTFE.

3. An optical focussing device as claimed in claim 1, characterized in that at the side which is to face the record carrier the objective is connected to the frame by means of a concentrically disposed flexible cuff which is provided with concentric folds.

4. An optical focussing device as claimed in claim 1, in which the electromagnetic means consist of a cylindrical coil connected rigidly and in an axially related manner to an axial end of the lens mount, and of a permanent magnet circuit with a cylindrical permanent magnet and a cylindrical air gap for the coil, characterized in that
    in the center of the cylindrical permanent magnet a cylindrical soft-iron magnet core is disposed,
    the cylindrical permanent magnet is covered by a soft-iron closing plate at one of its axial sides, and
    the cylindrical air gap is situated between a wall of a central opening in the closing plate and the magnet core.

5. An optical focussing device as claimed in claim 4, characterized in that the closing plate is disposed at the side of the objective which is to face the record carrier.

6. An optical focussing device as claimed in claim 3, characterized in that
    the flexible cuff is disposed at a detachable cover which surrounds one end of the objective,
    the cover comprises a number of metal connection tags which extend through a wall of the cover at either side, and
    a number of coil terminations of the coil which is attached to the objective is connected to the connection tags.

7. An optical focussing device as claimed in claim 6, characterized in that the objective and the cover are provided with mutually co-operating stop means which limit the axial travel of the objective relative to the cover.

* * * * *